(12) United States Patent
Batcher (10) Patent No.: US 11,599,649 B2
(45) Date of Patent: Mar. 7, 2023

(54) METHOD AND APPARATUS FOR MANAGING TRANSMISSION OF SECURE DATA PACKETS

(71) Applicant: Rockwell Automation Technologies, Inc., Mayfield Heights, OH (US)

(72) Inventor: Kenneth William Batcher, Hudson, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 86 days.

(21) Appl. No.: 16/914,683

(22) Filed: Jun. 29, 2020

(65) Prior Publication Data

US 2021/0406387 A1 Dec. 30, 2021

(51) Int. Cl.
| | |
|---|---|
| G06F 21/60 | (2013.01) |
| H04L 9/32 | (2006.01) |
| H04L 9/06 | (2006.01) |
| G06F 13/16 | (2006.01) |
| G06F 21/78 | (2013.01) |
| G06F 21/72 | (2013.01) |

(52) U.S. Cl.
CPC ........ *G06F 21/606* (2013.01); *G06F 13/1668* (2013.01); *G06F 21/602* (2013.01); *G06F 21/72* (2013.01); *G06F 21/78* (2013.01); *H04L 9/0643* (2013.01); *H04L 9/3247* (2013.01)

(58) Field of Classification Search
CPC .. G06F 21/606; G06F 13/1668; G06F 21/602; G06F 21/72; G06F 21/78; H04L 9/0643; H04L 9/3247
See application file for complete search history.

(56) References Cited

U.S. PATENT DOCUMENTS

| | | | | |
|---|---|---|---|---|
| 4,922,438 A | * | 5/1990 | Ballweg ................ | H04J 3/0632 370/506 |
| 5,289,469 A | * | 2/1994 | Tanaka ................... | H04L 69/321 370/469 |
| 5,974,518 A | * | 10/1999 | Nogradi .................. | H04L 49/90 709/236 |

(Continued)

FOREIGN PATENT DOCUMENTS

| | | | | |
|---|---|---|---|---|
| CA | 2244337 C | * | 1/2009 | .......... G06F 7/5052 |
| CN | 1366400 A | * | 8/2002 | |

(Continued)

*Primary Examiner* — Shahriar Zarrineh
(74) *Attorney, Agent, or Firm* — Boyle Fredrickson, SC (57) ABSTRACT

A logic circuit for generation of data signatures and/or encryption of data packets to be transferred from an industrial controller snoops data as it is written to an output buffer within the industrial controller. The logic circuit generates a secure signature and/or coordinates encryption of the data packet being transferred between the shared memory location and the output buffer. If encryption of the data is required, an encryption module may both encrypt the data and generate a secure signature. If encryption is not required, the logic circuit generates the secure signature. In either case, the logic circuit controls ownership of the memory address in which the secure signature is to be written to coordinate with the MAC transferring the secure signature to the output buffer, providing a uniform interface between the SPP module and the MAC.

20 Claims, 5 Drawing Sheets

(56) References Cited

U.S. PATENT DOCUMENTS

| | | | | |
|---|---|---|---|---|
| 5,986,714 A * | 11/1999 | Marino | | H04N 19/152 |
| | | | | 718/101 |
| 6,088,800 A * | 7/2000 | Jones | | H04L 9/14 |
| | | | | 713/193 |
| 6,147,980 A * | 11/2000 | Yee | | H04B 7/18508 |
| | | | | 370/316 |
| 6,311,276 B1 | 10/2001 | Connery et al. | | |
| 6,577,625 B1 * | 6/2003 | Chiou | | H04L 12/413 |
| | | | | 370/352 |
| 6,754,899 B1 * | 6/2004 | Stoye | | G06F 13/18 |
| | | | | 711/158 |
| 7,130,308 B2 * | 10/2006 | Haddock | | H04L 47/2441 |
| | | | | 370/428 |
| 7,230,917 B1 * | 6/2007 | Fedorkow | | H04L 47/30 |
| | | | | 370/229 |
| 7,406,089 B1 | 7/2008 | Rahim et al. | | |
| 7,652,996 B2 * | 1/2010 | Kim | | H04N 21/23406 |
| | | | | 370/235 |
| 8,635,412 B1 * | 1/2014 | Wilshire | | G06F 15/167 |
| | | | | 711/E12.066 |
| 8,793,795 B1 * | 7/2014 | Ravid | | G06F 21/78 |
| | | | | 726/24 |
| 8,976,813 B2 | 3/2015 | Bekiares et al. | | |
| 9,853,977 B1 * | 12/2017 | Laucius | | H04L 9/321 |
| 2002/0089981 A1 * | 7/2002 | Benayoun | | H04L 49/201 |
| | | | | 370/442 |
| 2006/0129491 A1 * | 6/2006 | Eun | | H04L 63/0428 |
| | | | | 705/51 |
| 2006/0146851 A1 * | 7/2006 | Choi | | H04L 49/3036 |
| | | | | 370/428 |
| 2007/0002761 A1 * | 1/2007 | Diamant | | H04L 61/00 |
| | | | | 370/252 |
| 2007/0192547 A1 * | 8/2007 | Feghali | | G06F 9/30145 |
| | | | | 711/147 |
| 2008/0062897 A1 * | 3/2008 | Loffink | | H04L 5/1492 |
| | | | | 370/294 |
| 2009/0016350 A1 * | 1/2009 | Matsuo | | H04L 49/9063 |
| | | | | 370/392 |
| 2010/0281532 A1 * | 11/2010 | Deng | | H04L 49/9057 |
| | | | | 726/11 |
| 2011/0264908 A1 * | 10/2011 | Feng | | H04L 29/12915 |
| | | | | 713/153 |
| 2014/0146666 A1 * | 5/2014 | Kwan | | H04L 47/12 |
| | | | | 370/230 |
| 2016/0048464 A1 * | 2/2016 | Nakajima | | G06F 12/1475 |
| | | | | 711/152 |
| 2017/0052907 A1 * | 2/2017 | Price, Jr. | | G06F 21/72 |
| 2017/0180261 A1 * | 6/2017 | Ma | | H04L 5/0055 |
| 2018/0295110 A1 * | 10/2018 | Chen | | H04L 69/40 |
| 2019/0044728 A1 * | 2/2019 | Karmoose | | H04L 9/12 |
| 2020/0134206 A1 * | 4/2020 | Thekadath | | H04L 9/3247 |
| 2021/0243193 A1 | 8/2021 | Padmanabhan | | |

FOREIGN PATENT DOCUMENTS

| | | | | |
|---|---|---|---|---|
| CN | 101087175 A | * | 12/2007 | |
| CN | 101090305 A | * | 12/2007 | |
| CN | 101350771 A | * | 1/2009 | |
| CN | 201247464 Y | * | 5/2009 | |
| CN | 102780611 A | * | 11/2012 | |
| CN | 105207816 A | * | 12/2015 | |
| CN | 107861889 A | * | 3/2018 | G06F 13/1668 |
| CN | 108494586 A | * | 9/2018 | H04L 41/0896 |
| CN | 108614792 A | * | 10/2018 | G06F 13/4059 |
| CN | 109643285 A | * | 4/2019 | G06F 16/258 |
| CN | 110717149 A | * | 1/2020 | G06F 21/12 |
| CN | 107066340 B | * | 5/2020 | G06F 9/544 |
| CN | 111310217 A | * | 6/2020 | |
| CN | 106027426 B | * | 7/2020 | H04L 49/103 |
| CN | 111727450 A | * | 9/2020 | G06Q 20/223 |
| CN | 112181513 A | * | 1/2021 | |
| JP | H11177581 A | * | 2/1999 | |
| JP | 3675693 B2 | * | 7/2005 | |
| JP | WO2004010315 A1 | * | 11/2005 | |
| JP | 2007110483 A | * | 4/2007 | |
| JP | 2011135565 A | * | 7/2011 | H04L 47/52 |
| KR | 100356884 B1 | * | 1/2003 | |
| TW | 539956 B | * | 7/2003 | |
| WO | WO-9710663 A1 | * | 3/1997 | H04L 12/4625 |
| WO | WO-9911036 A1 | * | 3/1999 | H04L 45/745 |
| WO | WO-0039962 A1 | * | 7/2000 | H04L 41/00 |
| WO | WO-2004032452 A1 | * | 4/2004 | H04L 12/2803 |
| WO | WO-2018228061 A1 | * | 12/2018 | G06F 11/1004 |
| WO | WO-2019126305 A1 | * | 6/2019 | G06F 21/606 |

* cited by examiner

METHOD AND APPARATUS FOR MANAGING TRANSMISSION OF SECURE DATA PACKETS

BACKGROUND INFORMATION

The subject matter disclosed herein relates to a method and apparatus for managing transmission of secure data packets on an industrial network. More specifically, an inline logic circuit monitors a data bus to detect the transfer of data packets to a network interface for transmission on the industrial network and to perform high speed generation of secure signatures, encryption, or a combination thereof on the data packet as the data packet is transferred from a shared memory location to a network port for transmission by the device sending the data packet.

Industrial controllers are specialized computer systems used for the control of industrial processes or machinery, for example, in a factory environment. Generally, an industrial controller executes a stored control program that reads inputs from a variety of sensors associated with the controlled process or machine. Sensing the conditions of the process or machine and based on those inputs and the stored control program the industrial controller determines a set of outputs used to control actuators for the process or machine.

Industrial controllers differ from conventional computers in a number of ways. Physically, they are constructed to be substantially more robust against shock and damage and to better resist extreme environmental conditions than conventional computers. The processors and operating systems are optimized for real-time control and are programmed with languages designed to permit rapid development of control programs tailored to a constantly varying set of machine control or process control applications.

Generally, the industrial controllers are embedded systems with a highly modular architecture that allows, for example, different numbers and types of input and output modules to be used to connect the controller to the process or machinery to be controlled. This modularity is facilitated through the use of special "control networks" suitable for highly reliable and available real-time communication. Such control networks (for example, ControlNet, EtherNet/IP, or DeviceNet) differ from standard communication networks (e.g. Ethernet) by guaranteeing maximum communication delays by pre-scheduling the communication capacity of the network and/or providing redundant communication capabilities for high-availability. In addition, packets transmitted on the control network are formatted according to a protocol defined for the particular network, such as the Common Industrial Protocol (CIP) or similar protocols. The control networks allow input and/or output modules to be distributed around a controlled machine or process while guaranteeing that data is received at the processor from an input module or provided to an output module in a timely manner. In some applications, multiple networks may be connected to an industrial controller. One or more networks may be control networks and one or more networks may be standard communication networks. The industrial controller must be configured to manage the network traffic on each network while maintaining the reliability and timing requirements of each control network to which it is connected. Since controllers are constrained embedded systems with tight real-time processing requirements, these designs must be efficient and robust in terms of data movement and CPU software cycles.

As is understood in the art, network communication functions are sometimes described in terms of a seven-layer Open Systems Interconnection (OSI) model. The first (bottom) layer is the physical layer which includes the hardware, such as network cabling, connectors, and other components required to provide the electrical and mechanical interface for transmitting data. The second layer is the data link layer which manages transfer of data frames between devices on the network. A Media Access Controller (MAC) may be part of the data link layer and may be provided at each port of the device connected to the network. Within the device, the MAC provides one of the first layers of data packet management for packets received from the network and one of the last layers of data packet management for packets transmitted on the network.

In an industrial controller, the MAC manages incoming data packets, temporarily storing them in receive buffers and then transmitting the data packets to a shared memory location for further processing by software. The software executing the further processing will be referred to herein as a Software Packet Processing (SPP) module. Similarly, the MAC also manages outgoing data packets. The SPP module is configured to assemble data into a data packet and write the data to shared memory. The MAC then transfers data from the shared memory location and loads data packets into transmit buffers for subsequent transmission on the physical network.

The SPP module also manages additional data handling requirements for each data packet to be transmitted from a device. Some secure data packets may require, for example, authentication of the data packets. Authentication messages can be sent without encryption, but the sending device must generate a secure signature for the data payload and header and append this secure signature to the data packet. The secure signature may be checked by the receiving device in order to verify the received packet arrived from the expected sender and to verify the integrity of the data. Other secure data packets may also require encrypted transmission in addition to authentication. Such incoming data packets may be encrypted and require decryption at the receiver, and outgoing data packets may require encryption prior to transmission. Each of the data handling requirements may require one or more additional reads, writes, or other processing of the data packet to complete, and each read, write, or other processing step introduces latency within the network between receiving the data packet and when the device is able to utilize the data.

In an industrial controller, however, these additional reads, writes, and other processing steps are undesirable overhead. Traditionally, the SPP module utilizes a portion of the processing capacity of the industrial controller to execute these steps. The additional processing overhead along with the latency introduced limits the rate at which the industrial controller may transfer data packets over the network and limits the rate at which other critical control functions may be performed.

Thus, it would be desirable to provide an improved method and apparatus for managing secure transmission of data packets from the industrial controller.

BRIEF DESCRIPTION

According to one embodiment of the invention, a method for managing transmission of secure data packets includes writing a data packet for transmission to a shared memory location and transferring the data packet from the shared memory location to an output buffer in a network interface. The data packet is transferred via a communication bus and is read from the communication bus as it is transferred from the shared memory location to the output buffer with an inline logic circuit. A secure signature of the data packet is generated with the inline logic circuit as the data packet is being transferred from the shared memory location to the output buffer, and the secure signature is appended to the data packet. The data packet is queued for transmission from the network interface after the secure signature has been appended to the data packet.

According to another embodiment of the invention, a communication circuit for managing transmission of secure data packets includes a software packet processing module, a network interface, and an inline logic circuit. The software packet processing module is configured to write a data packet for transmission to a shared memory, and the network interface is configured to transfer the data packet from the shared memory location to an output buffer via a communication bus and to queue the data packet for transmission from the output buffer. The inline logic circuit is configured to read the data packet from the communication bus as it is transferred from the shared memory location to the output buffer, generate a secure signature of the data packet as the data packet is being transferred by the network interface from the shared memory location to the output buffer, and append the secure signature to the data packet. The data packet is queued for transmission from the output buffer after the secure signature has been appended to the data packet.

According to still another embodiment of the invention, a method for managing transmission of secure data packets writes a data packet for transmission to a shared memory and writes a descriptor to a descriptor ring in the shared memory with a software packet processing module. A header for the data packet defines a secure operation to perform on the data packet prior to transmission. A network interface periodically monitors the descriptor ring to detect when the data packet is available for transmission. The data packet is transferred from the shared memory to an output buffer in the network interface via a communication bus when the data packet is available, and an inline logic circuit reads the data packet from the communication bus as it is transferred from the shared memory location to the output buffer. The inline logic circuit sets a done bit when the data packet has been transferred to the output buffer and the data packet is ready for transmission, and the data packet is queued for transmission from the network interface after the inline logic circuit has set the done bit.

These and other advantages and features of the invention will become apparent to those skilled in the art from the detailed description and the accompanying drawings. It should be understood, however, that the detailed description and accompanying drawings, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Various exemplary embodiments of the subject matter disclosed herein are illustrated in the accompanying drawings in which like reference numerals represent like parts throughout, and in which.

In describing the various embodiments of the invention which are illustrated in the drawings, specific terminology will be resorted to for the sake of clarity. However, it is not intended that the invention be limited to the specific terms so selected and it is understood that each specific term includes all technical equivalents which operate in a similar manner to accomplish a similar purpose. For example, the word "connected," "attached," or terms similar thereto are often used. They are not limited to direct connection but include connection through other elements where such connection is recognized as being equivalent by those skilled in the art.

DETAILED DESCRIPTION

The various features and advantageous details of the subject matter disclosed herein are explained more fully with reference to the non-limiting embodiments described in detail in the following description.

The subject matter disclosed herein describes an improved method and apparatus for managing secure transmission of data packets from the industrial controller. A logic circuit is provided which snoops data being transferred between a shared memory location and an output buffer of a network interface within the industrial controller. The logic circuit is connected to a communication bus in a read-only manner, where the data packet is transferred from the shared memory location to the output buffer via the communication bus. The data packet is, therefore, available to the logic circuit, in parallel, to being transferred between the shared memory location and the output buffer. The logic circuit is configured to generate a secure signature and/or perform encryption on the data packet as the data packet is being transferred between the shared memory location and the output buffer.

The SPP module sets a first status bit indicating when the data is present in a transmit queue of the shared memory and is available for transmission to the output buffer. Ordinarily, the SPP module would also be required to generate a secure signature and/or perform encryption prior to writing the data to the shared memory location. According to one embodiment of the present invention, the SPP module instead generates one or more descriptors defining whether a secure signature and/or encryption is required and writes the clear data to the shared memory. The logic circuit monitors the descriptors and receives the data as it is transmitted between the shared memory and the output buffer and coordinates with the MAC to ensure the secure signature is generated and/or encryption is performed as defined by the SPP module. The logic circuit is able to generate the secure signature as the data is being transferred if necessary. If the logic circuit is required to generate the secure signature, the logic circuit may take ownership of the memory address in which the secure signature is to be written or control, at least in part, data flow on communication bus. The logic circuit generates the secure signature as the data is being transferred and writes the secure signature to the memory address defined in the descriptor. If the logic circuit has ownership of the memory address, the MAC cannot immediately read the secure signature after transferring the header(s) and payload of the data packet to the output buffer. Rather, the MAC must wait for the logic circuit to write the newly determined secure signature and release ownership of the memory address. Alternately, the logic circuit pauses the MAC while transferring the data from shared memory to the output buffer when the MAC has transferred the header(s) and payload. After the secure signature has been generated and is written in the shared memory, the logic circuit allows the MAC to resume transferring data and the secure signature is transferred to the output buffer. Thus, the logic circuit may generate a secure signature in tandem with the data being transferred from the shared memory to the output buffer and coordinate access of the secure address with the MAC.

If encryption of the data is required, the SPP module generates an encryption descriptor defining the necessary cryptographic operation and/or key required to perform the operation. A separate encryption module monitors the encryption descriptor ring to detect the presence of a new descriptor. The encryption module may both encrypt the data and generate a secure signature. The logic circuit may similarly monitor the descriptors and recognize when encryption is required and when the encryption module is generating the secure signature. Rather, than duplicating the process, the logic circuit either releases ownership of the secure signature address prior to the MAC needing access or the logic circuit never claims ownership of the address, allowing the MAC to continually transfer the header(s), payload, and then the secure signature from the shared memory to the output buffer. The logic circuit provides a uniform interface between the SPP module and the MAC to coordinate required operations, as defined by the SPP module, without requiring differing operation of the MAC to transfer the data from the shared memory to the output buffer. The processing performed by the logic circuit results in a significant savings in the processing that the SPP module needs to perform. Further, all outgoing data packets receive a uniform amount of processing by the SPP module whether the data packet requires no security processing, requires authentication only, or requires both authentication and decryption.

Figure 1:
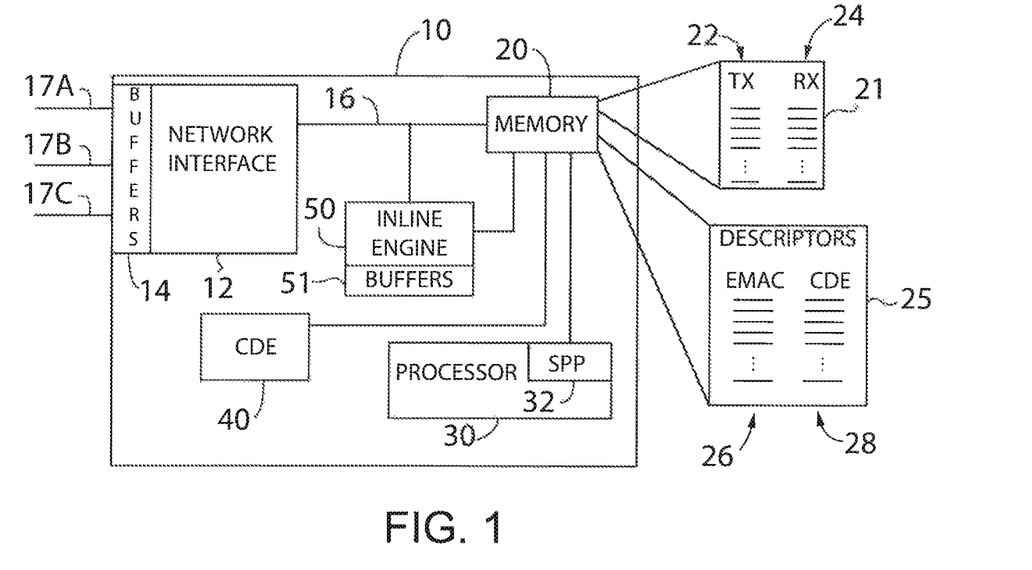
FIG. 1 is a block diagram representation of an exemplary network device incorporating one embodiment of a communication circuit for high speed authentication or decryption of data packets.

Turning initially to FIG. 1, portions of an exemplary network device 10 are illustrated in block diagram form to illustrate a communication circuit which may generate a secure signature for data packets or coordinate encryption of those data packets. For ease of description, the embodiment illustrated in FIG. 1 will be discussed as an embodiment incorporated within an industrial controller. The network device 10 includes a network interface 12 configured to be connected to an industrial network. The industrial network may be any suitable network according to the application requirements. The network may be a control network, including, but not limited to ControlNet, EtherNet/IP, or DeviceNet, and configured to transmit data according to their respective predefined scheduling, availability, and/or other control requirements. Optionally, one or more standard networks, such as Ethernet, may be connected to the network interface 12. The network interface 12 includes multiple channels 17, or ports, where each channel may be connected to a different network or to different segments of the same network. The network interface 12 includes buffers 14, where a portion of the buffers 14 may be input buffers allocated to data being received at the network interface 12 and a portion of the buffers 14 may be output buffers allocated to data being transmitted from the network interface 12. According to the illustrated embodiment, the network interface 12 includes three channels 17A, 17B, and 17C. Each channel may have a separate set of buffers 14 defined for both receiving and transmitting data. Each channel may also include a separate Media Access Controller (MAC) configured to manage data transfer from the physical network to the network device. The MAC may be configured according to the network to which it is connected to manage the protocol of the network and to encapsulate the data packets to be transmitted into data frames and extract data packets from the data frames received. For ease of discussion, the invention will be discussed with respect to a Gigabit Ethernet MAC (EMAC) 18 (see also FIG. 6) and each of the three channels 17A, 17B, 17C will have a separate EMAC managing the data flow to and from the network. It is contemplated that various other numbers of channels may be provided and various other MACs may be utilized without deviating from the scope of the invention.

The network interface 12 is connected to shared memory 20 via a communication bus 16. When a data frame is received at the network interface 12, the EMAC manages the data flow with Direct Memory Access (DMA) and transfers the data packet to the shared memory 20 via the communication bus 16. An inline engine 50, also referred to herein as an inline logic circuit, is connected to the communication bus 16 to monitor data being transferred along the data bus. The inline engine 50 passively reads data being transferred along the communication bus 16 and may also observe access of the descriptor tables 25 in shared memory 20 by software, such as the SPP module 32, or by hardware, such as the EMAC, CDE, or the like. It is contemplated that the inline engine 50 may be a portion of logic gates arranged on a customizable logic device, for example, on a field programmable gate array (FPGA), application specific integrated circuit (ASIC), or other similar custom logic device. Optionally, the inline engine 50 may be configured from a number of discrete logic devices. According to still another embodiment, the inline engine may be a combination of a customizable logic device and discrete logic devices. The inline logic engine 50 includes a set of buffers 51 for storing intermediate data received from the communication bus 16 as it streams past on the way to the final memory location. The inline logic engine 50 is also in communication with the shared memory 20 and may read or write data to the buffers 51, the shared memory 20, descriptors, or a combination thereof.

The network device 10 also includes an encryption/decryption engine. According to the embodiment illustrated in FIG. 1, the encryption/decryption engine is referred to as a Crypto DMA Engine (CDE) 40. The CDE 40 is also in communication with the shared memory 20. Operation of the CDE will be discussed in more detail below.

The network device 10 further includes a processor 30. It is contemplated that the processor may be a single device or multiple devices. The processor 30 may include a single processing core or multiple processing cores. It is contemplated that the processor 30 may be a dedicated processing device, integrated on the FPGA or ASIC, or a combination thereof. The processor 30 is also in communication with the shared memory 20. The processor 30 is configured to execute stored instructions to manage data being sent to or received from the network. Although the network interface 12, inline engine 50, CDE 40, and processor 30 are all shown with separate connections to the shared memory, it is contemplated that one or more of the devices may share a common communication bus 16. Optionally, the network device 10 may include multiple communication busses and each element of the network device 10 may be connected to one or more of the communication busses and may be in communication with one or more of the other elements within the network device 10.

Applications executing on the processor 30 require data from, or transmit data to, other devices on the industrial network. The data transferred is dependent upon the application requirements. However, exemplary data includes input signals received from sensors, switches, and the like connected to the industrial controller and distributed around a controlled machine or process. The processor 30 may be executing a control program which receives the input signals and generates output signals that need to be transmitted to actuators such as solenoids, contacts, motor drives and the like similarly distributed around the controlled machine or process. It is contemplated that inputs may be aggregated, for example, by an input module or by another network device connected in a distributed rack such that a data packet includes multiple input signals. Similarly, the output signals may be aggregated by the processor 30 prior to transmission such that multiple output signals are transmitted in a single data packet to a remote rack or to individual output modules. The data may have tight timing and synchronization requirements. Consequently, real-time processing efficiency and low latency data transfers help meet these requirements. A communication routine may execute on the processor 30 to manage data flow between the shared memory 20 and cache present on the processor 30 for use by the control program. The communication routine will be referred to herein as a Software Packet Processing (SPP) module 32 and may be configured to implement one or more layers of the OSI model.

Figure 6:
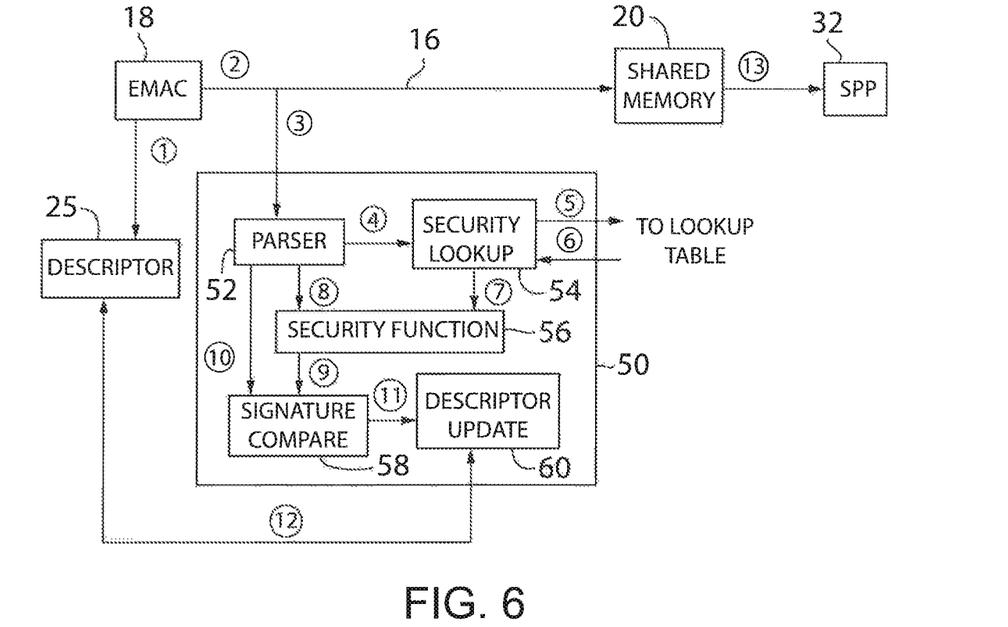
FIG. 6 is a flow diagram illustrating steps in high speed authentication of data packets received at the network interface according to one embodiment of the invention.

In operation, the inline engine 50 monitors data traffic along the communication bus 16 and provides high speed authentication of the data being received by the network interface 12 or transferred by the network interface tinder direction of the SPP module 32. Referring first to FIG. 6, the process of authentication for data received by the network interface 12 will first be discussed. At step 1 (indicated by a circled numeral), a data frame 100 is received at the network interface 12 and the EMAC 18 creates a EMAC descriptor 26 for the data packet 101 (see also FIG. 2). Descriptors are stored in a descriptor table 25, which may be included in the shared memory 20 or may be in a separate memory. The descriptor table 25 may, however, be read from and written to by the EMACs 18 in the network interface 12, the inline engine 50, and the SPP module 32. A descriptor table may be a circular buffer, where data is initially written into the first entry of the table and each successive entry is consecutively stored in the table. When the number of entries written into the table is equal to the size of the table, the next entry overwrites the oldest entry in the table. Each new entry will continually over-write the oldest entry forming the circular buffer.

According to the embodiment illustrated in FIG. 1, the descriptor table 25 includes two sets of descriptors. A first set of descriptors 26 corresponds to a data packet 101 either received by or to be transmitted by one of the EMACs 18. A second set of descriptors 28 corresponds to the CDE 40. Similar to the EMAC descriptors 26, each CDE descriptor 28 corresponds to a data packet 101 requiring either encryption or decryption. The CDE descriptors 28 will be discussed in more detail below with respect to the inline engine 50 managing encryption or decryption.

Figure 4:
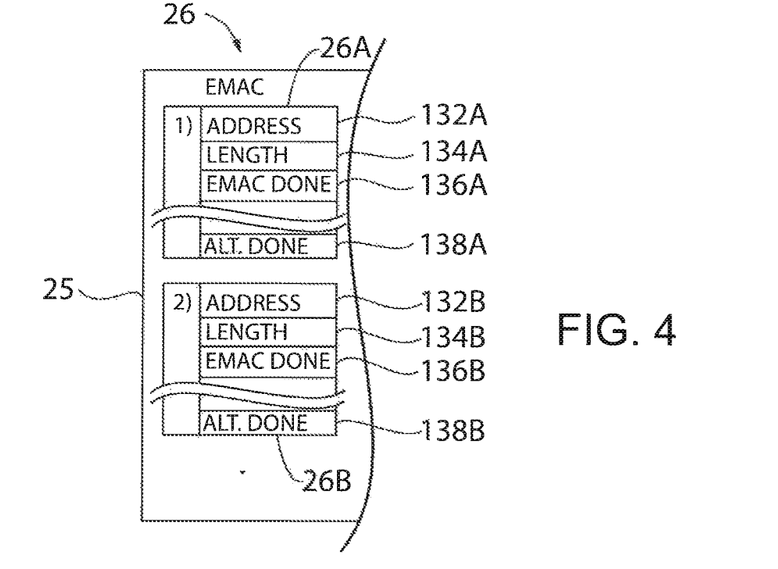
FIG. 4 is a block diagram illustrating, at least in part, an exemplary structure of a Gigabit Ethernet MAC (EMAC) descriptor utilized by the EMAC descriptor ring of FIG. 1.

As further illustrated in FIG. 4, each EMAC descriptor 26 in the table defines information about the data packet 101 being transmitted or received. A first and second EMAC descriptor 26A, 26B are illustrated. However, it is contemplated that the table 25 may include, for example, 128 or 256 entries. Each EMAC descriptor 26 includes multiple fields defining, among other things, an address 132 within shared memory 20 at which the payload 106 will be stored, a length 134 of the payload, a first ownership bit (e.g., EMAC done) 136, and a second ownership bit (e.g. alternate done) 138. As will be discussed in more detail below, it is contemplated that a first portion of each EMAC descriptor 26 may be generated by the EMAC 18 as a data packet 101 is received and a second portion of each EMAC descriptor 26 may be generated by the inline engine 50 as it monitors the data packet 101 being transferred along the communication bus 16. According to one embodiment of the invention, the EMAC 18 may create a 64-bit descriptor corresponding to each data packet 101 and the inline engine 50 may create a second 64-bit descriptor for the same data packet. It is contemplated that the descriptor table 25 may be configured to accept 128-bit descriptors where the EMAC 18 stores its 64-bit descriptor in the first half of the memory block for each descriptor and the inline engine 50 stores its 64-bit descriptor in the second half of the memory block corresponding to the same data packet. Optionally, the EMAC 18 may generate 128-bit descriptors and the inline engine 50 may be configured to read or write data within the descriptor 26 generated by the EMAC 18.

As previously mentioned, when a data frame 100 is received at the network interface 12, the EMAC 18 creates a EMAC descriptor 26 for the data packet 101. Initially, the EMAC 18 sets ownership of the data packet 101 as belonging to the network interface 12. Ownership may be defined by clearing the EMAC done bit 136 in the EMAC descriptor 26. When the EMAC 18 completes transferring the data and wants to transfer ownership, the EMAC done bit 136 may be set indicating that the EMAC has no further processing to perform on the data packet 101. In addition to clearing the EMAC done bit 136, the EMAC 18 determines the length of the data from the data packet that needs to be transferred to the shared memory 20. The shared memory 20 includes a queue portion 21 where a first queue may be a transmit queue 22 and a second queue may be a receive queue 24. The EMAC 18 reads the descriptor table 25 to determine whether there are any existing data buffers available in the receive queue 24 and identifies the next available location at which the data from the data packet 101 presently being received may be stored. The address 132 of the location and the length 134 of data to be stored are both written in the EMAC descriptor 26. It is contemplated that the EMAC 18 may write still other data into the EMAC descriptor 26, where other bits or words may be required by the SPP module, the control program, or still other modules executing on the network device 10.

Returning again to FIG. 6, the EMAC 18 next writes the data from the data packet 101 to the shared memory 20, as shown in step 2. As the EMAC 18 is transferring the data, the inline logic circuit 50 monitors the data being transferred, as shown in step 3. The inline logic circuit 50 receives the data as a read only function from the communication bus 16 and does not interfere with transmission of the data from the network interface 12 to the shared memory 20. The EMAC 18 continues to transfer the data until all of the data has been transferred and sets the EMAC done bit 136 in the EMAC descriptor indicating that the EMAC 18 no longer has ownership of the data. Under traditional processing, the SPP module 32 would periodically monitor the EMAC descriptor 26 and wait for this EMAC done bit to be set in order to take further action on the data received from the data packet. However, the SPP module 32 has been modified to wait for an alternate done bit 138, such as an authentication done bit, to be set prior to taking further action on the data received.

Figure 2:
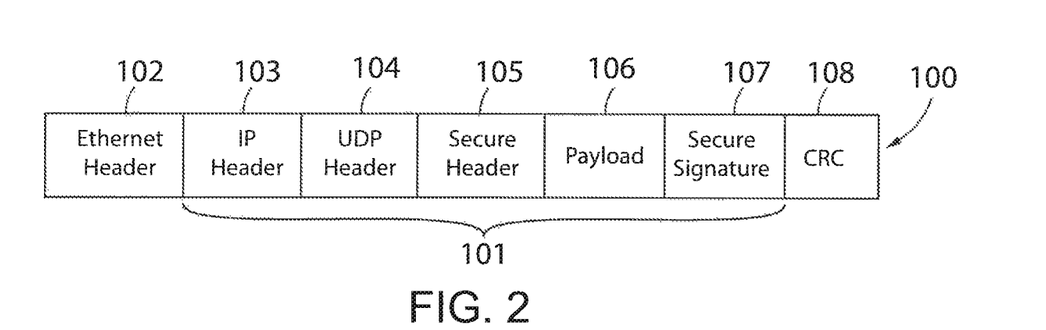
FIG. 2 is a block diagram representation of an exemplary data frame received at a network interface of FIG. 1.
Figure 3:
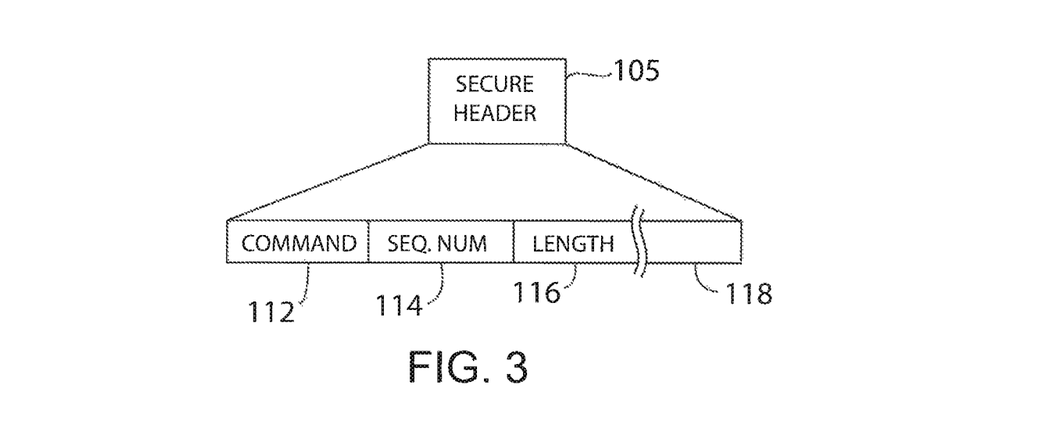
FIG. 3 is a block diagram illustrating, at least in part, contents of the secure header of FIG. 2.

The inline logic circuit 50 uses the data received from the communication bus 16 to perform authentication of the data as the data is being transferred from the network interface 12 to the shared memory 20. At step 4, a parser 52 in the inline logic circuit monitors the traffic on the communication bus 16 and identifies a header for the data packet. With reference also to FIG. 2, an exemplary data frame 100 is shown. The data frame 100 includes an Ethernet header 102 and a CRC checksum 108. The Ethernet header 102 and CRC checksum 108 may be stripped by the EMAC 18 from data frames 100 as they are received and added to data packets 101 to be transmitted. An Internet Protocol (IP) header 103, a User Datagram Protocol (UDP) header 104, a secure header 105, the data payload 106, and a secure signature 107 remain in the data packet 101 and are transferred from the EMAC 18 to the shared memory 20. The parser identifies the secure header 105 and further extracts data from the secure header 105. As shown in FIG. 3, the secure header may include, among other things, a command 112, a sequence number 114, and a length 116. The command 112 may include a Security Association for the data packet 101, which defines the method of authentication to be implemented on the corresponding data packet. Optionally, the inline engine 50 uses information in the headers of the data frame 100 to look-up a Security Association for the command 112, as discussed in more detail below. The sequence number may be used for replay protection, thereby ensuring that the data packets 101 are being received in the correct order. Replay protection may also prevent a spoofing attack in which data packets are captured and stored by a malicious device and an attempt is made to transmit the stored packets at a later date. The length 116 corresponds to a length of the payload 106 in the data packet 101.

Having identified and extracted information from the secure header 105, the parser 52 retrieves the Security Association corresponding to the command using the security lookup circuit 54. A Security Association table may be previously defined in memory within the inline logic circuit 50, in the shared memory 20, or in another segment of memory in communication with the inline logic circuit 50. The Security Association defines a security operation that is to be performed using the secure header 105 and the payload 106 of the data packet 101 in order to generate the secure signature 107. For a key-based operation, the Security Association table includes a secure key used to generate the authentication signature for the data packet 101. The secure key may have been stored in memory, for example, during an initial sequence of control messages between the source of the data packet and the network device 10, where the initial sequence of control messages established a connection between the two devices. It is contemplated that multiple connections may be simultaneously established with the network device 10 between one or more other devices, and each connection may have a separate key stored in the Security Association table. It is further contemplated that different connections may require different security algorithms, utilize different protocols, or utilize different frame formats, and the inline logic circuit 50 may be configured to identify the different protocol or frame format of the incoming data packet, parse the data packet accordingly, and identify the appropriate security algorithm for each connection.

To authenticate a data packet 101 as being a valid data packet sent via a particular connection, the security lookup circuit 54 retrieves the key from the lookup table via steps 5 and 6. At step 5, the security lookup circuit 54 issues a read request from the lookup table to obtain the desired key. At step 6, the key is returned from the lookup table to the security lookup circuit 54. It is contemplated that authentication is performed, for example via a keyed-hash algorithm, also referred to as a Hash-based Message Authentication Code (HMAC). Optionally, other security operations may be utilized without deviating from the scope of the invention.

At steps 7 and 8, the necessary information for the inline logic circuit 50 to perform authentication are passed to a security function circuit 56. The parser 52 passes the secure header 105, including the length 116 of the payload 106 in the data packet 101, and the security lookup circuit 54 passes the key, which was retrieved from the security association table, to the security function circuit 56. Data is continually received at the parser 52 from the communication bus 16, and the parser 52 forwards the additional data from the data packet 101 to the security function circuit 56. Knowing the length 116 of data expected in the payload 106 of the data packet 101 and knowing the key used by the keyed-hash algorithm, the security function circuit 56 is able to generate a secure signature for the data packet 101.

Once the security function circuit 56 completes its generation of a secure signature, the secure signature is used by a signature compare circuit 58 as shown in step 9. The parser 52 continues to receive data from the communication bus 16 and, knowing the length of the payload, the parser 52 may transfer the secure signature 107, received after the payload 106, from the data packet 101 to the signature compare circuit 58, as shown in step 10. Because the source of the data packet 101 used the same key and the same keyed-hash algorithm to generate the secure signature 107 in the data packet 101, this secure signature generated by the security function circuit 56 should match the secure signature 107 in the data packet. A matching secure signature provides authentication of the data in the payload both verifying that the data was from the expected source and that there were no errors in transmission.

The signature compare circuit 58 may then perform a comparison of the secure signature 107 from the data packet to the secure signature generated by the security function circuit. Although not illustrated in FIG. 4, it is contemplated that a portion of the descriptor 26 for each data packet may include status bits that are set or reset by the inline logic circuit 50. These status bits may be defined in locations within the EMAC descriptors 26 that are not used by the EMAC 18. As a result, no modification of the EMAC 18 is required. One such status bit may indicate whether a comparison of the secure signature 107 from the data packet to the secure signature generated by the security function circuit was a success. If successful, the SPP module 32 is aware that the data packet 101 in the shared memory 20 has been authenticated. If unsuccessful, the SPP module 32 is similarly aware that authentication failed. In either instance, the SPP module 32 may take appropriate action based on the success or failure of authentication.

The success or failure of authentication may be just one of the various descriptor bits generated within the inline logic circuit 50. It is contemplated, for example, that a first portion of the data packets 101 may require authentication and a second portion of the data packets 101 may not require authentication. The inline logic circuit 50 handles data packets 101 requiring any level of security, such as those packets with no security requirements, that require authentication only, or that require both authentication and decryption. The parser 52 may be configured to identify whether a data packet required authentication and set another status bit accordingly. If no authentication is required, the data packet 101 may not include the secure header 105 or the secure signature 107. The security circuits (54, 56, 58) would not execute and there would be no status bit set indicating a successful authentication because no authentication occurred. Nevertheless, the SPP module 32 could first check the status bit defining whether authentication was required and respond appropriately.

The inline logic circuit 50 is also configured to set the alternate done bit 138 shown in the EMAC descriptor 26. As shown in FIG. 1, the inline logic circuit 50 is in communication with the shared memory 20. The inline logic circuit 50 monitors all read or write data traffic into or out of the shared memory 20, including both the queue portion 21 and the descriptor tables 25. The inline logic circuit 50 observes the EMAC descriptor 26 and monitors the state of the EMAC done bit 136. Once the EMAC 18 indicates it is done transferring data to the receive queue 24 and sets the EMAC done bit 136, the inline logic circuit may, in turn, set the alternate done bit 138. If, for example, no authentication is required, the parser 52 has already identified that no authentication is required and set an appropriate status bit. The no authentication status bit may be sent to the descriptor update circuit 60 either directly from the parser 52 or via the signature compare circuit 58 as shown in step 11. The descriptor update circuit 60, in turn may set the status bit and additionally set the alternate done bit 138 in the corresponding EMAC descriptor 26 for the data packet. If authentication is required, the security function circuit 56 may require a few additional processing cycles after the EMAC 18 is done writing data to shared memory 20 because the data received from the communication bus 16 must pass through the inline logic circuit 50 to the security function circuit 56 and the security operation, such as the keyed-hash algorithm, must execute on all of the data. Additionally, the signature compare circuit 58 must, upon completion of the security function circuit 56, compare the signature generated by the security function circuit 56 to the secure signature 107 in the data packet 101. Once the signature compare circuit 58 is complete and has set the status bit indicating whether authentication was successful, both status bits indicating first that authentication was required and second whether authentication was successful may be passed to the descriptor update circuit 60. The descriptor update circuit 60 writes each status bit to the descriptor 26 and further sets the alternate done bit 138 in the EMAC descriptor. Use of the alternate done bit gives flexibility to the inline logic circuit 50 to perform functions, as required by the data packet 101, and then to set the alternate done bit 138 upon completion. Further, the SPP module 32 periodically polls the alternate done bit 138 to determine when both the EMAC 18 and the inline logic circuit 50 are done with the data packet 101 and that the SPP module 32 may take ownership of and begin operations on the data packet 101.

Although the inline logic circuit 50 has been described above with respect to FIG. 6 and with respect to certain modules, or circuits, illustrated therein, including the parser 52, the security lookup circuit 54, the security function circuit 56, the signature compare circuit 58, and the descriptor update circuit 60, it is understood that each circuit is a portion of the inline logic circuit 50 and the particular delineation of modules to perform different functions is not intended to be limiting. Rather, the above embodiment illustrated in FIG. 6 is intended to be exemplary and provides one embodiment of the invention. It is contemplated that the functions performed by specific modules may be performed by other modules or multiple modules may be combined into a single module without deviating from the scope of the invention. Each of the modules described herein is implemented on a portion of the customizable logic device and/or discrete logic devices which make up the inline logic circuit 50.

Figure 10:
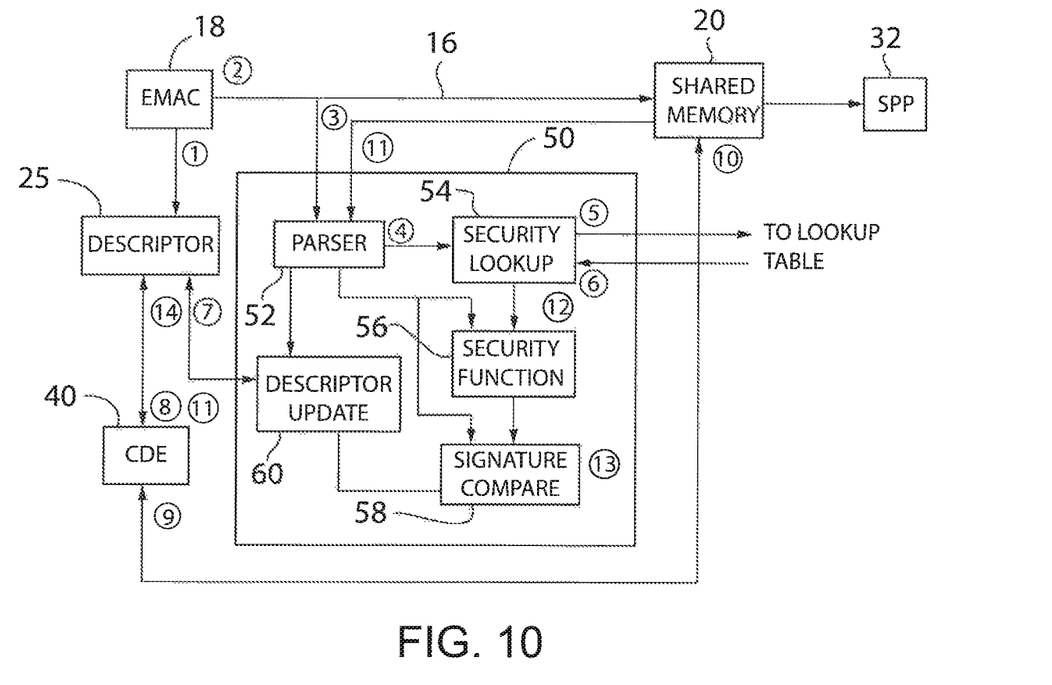
FIG. 10 is a flow diagram illustrating steps for decryption and authentication of data packets received at the network interface according to one embodiment of the invention.

In some applications, data packets 101 received from the network may require decryption in addition to authentication. Turning next to FIG. 10, the process of decrypting data prior to authentication is illustrated. At step 1 (again indicated by a circled numeral), a data frame 100 is received at the network interface 12 and the EMAC 18 creates a EMAC descriptor 26 for the data packet 101 (see also FIG. 2). The EMAC descriptor 26 is generated in a manner similar to that discussed above for data packets only requiring authentication. Each EMAC descriptor 26 may be stored in a first descriptor ring in the descriptor table 25, which may be included in the shared memory 20 or may be in a separate memory. The descriptor table 25 may be read from and written to by the EMACs 18 in the network interface 12, the inline engine 50, and the SPP module 32. The descriptor ring may be a circular buffer, where data is initially written into the first entry of the ring and each successive entry is consecutively stored in the ring. When the number of entries written into the ring is equal to the size of the ring, the next entry overwrites the oldest entry in the ring. Each new entry will continually over-write the oldest entry forming the circular buffer.

The EMAC 18 next writes the data from the data packet 101 to the shared memory 20, as shown in step 2. As the EMAC 18 is transferring the data, the inline logic circuit 50 monitors the data being transferred, as shown in step 3. The inline logic circuit 50 receives the data as a read only function from the communication bus 16 and does not interfere with transmission of the data from the network interface 12 to the shared memory 20. The EMAC 18 continues to transfer the data until all of the data has been transferred and sets the EMAC done bit 136 in the EMAC descriptor indicating that the EMAC 18 no longer has ownership of the data. Under traditional processing, the SPP module 32 would periodically monitor the EMAC descriptor 26 and wait for this EMAC done bit to be set in order to take further action on the data received from the data packet. However, the SPP module 32 has been modified to wait for an alternate done bit 138, conditioned on authentication and/or decryption being done, to be set prior to taking further action on the data received.

The inline logic circuit 50 again uses the data received from the communication bus 16 to determine what security functions are required for the data packet. At step 4, the parser 52 in the inline logic circuit monitors the traffic on the communication bus 16 and identifies the header for the data packet. At steps 5 and 6, the security lookup circuit 54 determines that the data packet is protected by both encryption and authentication, indicating that the decryption of the data is required. The inline logic circuit 50 may then take additional steps to manage decryption of the data packet 101 before allowing the SPP module 32 to access the data.

Figure 5:
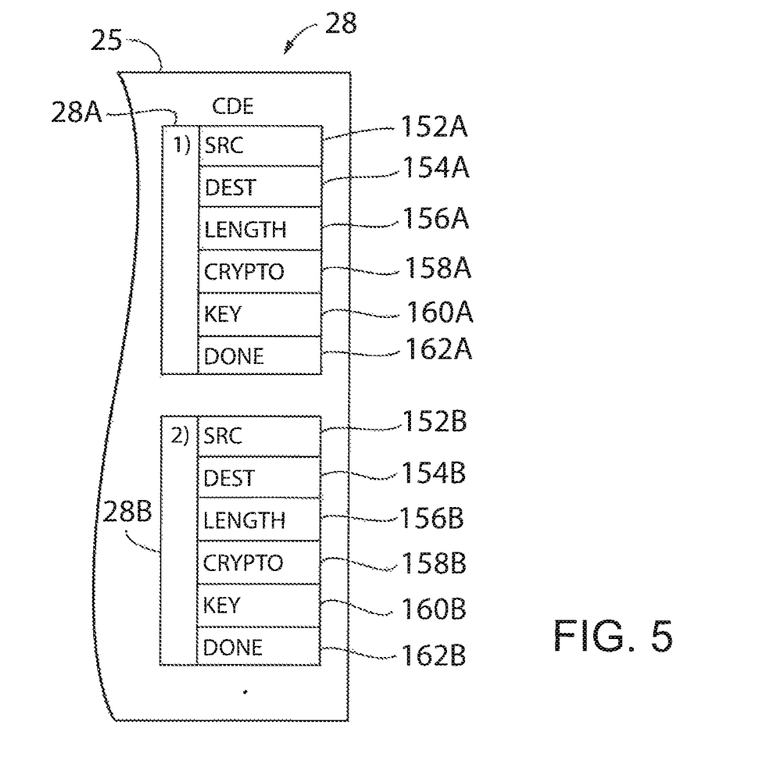
FIG. 5 is a block diagram illustrating, at least in part, an exemplary structure of a decryption descriptor utilized by the decryption descriptor ring of FIG. 1.

Upon detecting that a data packet 101 requires decryption, the inline logic circuit 50 generates an CDE descriptor 28. The inline logic circuit 50 may utilize information obtained by the security lookup circuit 54 about the particular method of decryption required for the corresponding data packet 101 to build the CDE descriptor 28. As further illustrated in FIG. 5, each CDE descriptor 28 in the table defines information about decryption of the data packet 101 being received. A first and second CDE descriptor 28A, 28B are illustrated. However, it is contemplated that the table 25 may include, for example, 128 or 256 entries. Each CDE descriptor 28 includes multiple fields defining, among other things, a source 152, destination 154, and length 156 of the message packet 101. The source 152 defines a memory address from which the CDE can read the encrypted data. The destination 154 defines a memory address at which the CDE can write the clear data, and the length 156 defines a length of data requiring decryption. The CDE descriptor 28 may also include a cryptography method 158 employed to encrypt the data packet and a key 160 required to perform decryption. Finally, a decryption done bit 162 is also defined within the CDE descriptor 28. After generating the CDE descriptor 28, the inline logic circuit 50 adds the new descriptor to a second descriptor ring for the CDE in the descriptor table 25 as shown in step 7. Separate descriptor rings may be managed for EMAC descriptors 18 and for CDE descriptors 28.

he CDE 40 monitors the descriptor table 25 to detect a new CDE descriptor 28 being added as shown with step 8. When the CDE 40 detects a new CDE descriptor 28, the CDE 40 manages decryption of the data packet according to the data written in the CDE descriptor 28. The CDE 40 reads the packet to be decrypted from the source address 152 as shown in step 9. It is contemplated that the source address is the same location in the shared memory 20 to which the EMAC 18 is transferring the received data packet. Thus, as the EMAC 18 completes writing data to the shared memory 20, the CDE 40 may begin reading the same data because the inline engine 50 coordinates operation of the CDE to begin after the EMAC 18 is done transferring data to the shared memory 20. The inline logic circuit 50 may monitor the EMAC done bit 136 in the EMAC descriptor 26 and generate the CDE descriptor 28 when the EMAC has completed writing data to the shared memory 20. The CDE 40 performs the decryption on the data packet 101 according to the cryptographic method specified in field 158 and using the key identified in field 160 of the CDE descriptor 28. The CDE 40 then writes the decrypted data back to the destination address 154 indicated in the CDE descriptor 28 as shown in step 10. It is contemplated that the destination address 154 may be the same as the source address 152. In this manner, the inline logic circuit 50, in coordination with the CDE 40, can cause clear data (i.e., data that is not encrypted) to be present in the shared memory rather than the encrypted data originally received at the network interface 12. Once the CDE 40 has written the clear data back to the destination address 154, the CDE 40 sets the done bit 162 in the CDE descriptor 28 as shown in step 11.

Once the decryption is complete, the inline logic circuit 50 may next handle authentication of the data packet 101. The inline logic circuit 50 is in communication with the descriptor table 25 and monitors the status of the CDE descriptor 28 it has previously written to the descriptor ring. Once the inline logic circuit 50 detects that the CDE done bit 162 is set, the inline logic circuit 50 may proceed with authentication.

The inline logic circuit 50 receives the data from the communication bus 16 as it is being transferred from the network interface 12 to the shared memory 20. However, if it is encrypted, the parser 52 is unable to read the data and perform authentication in the same manner discussed above. The inline logic circuit 50 is, however, in communication with both the descriptor table 25 and the shared memory 20. When the inline logic circuit 50 detects that the CDE done bit 162 is set, the inline logic circuit 50 may read the clear data from the shared memory 20 to perform authentication of the data. Authentication proceeds in the same manner discussed above except that the parser 52 utilizes the clear data being read from the shared memory, as shown in step 11, to perform the authentication. The security operation by which the secure signature 107 is generated, was previously determined by the security lookup circuit 54 as shown in steps 5 and 6. The security function circuit 56 executes the security operation on the clear data to generate the secure signature, and the signature compare circuit compares the secure signature generated by the security function circuit 56 against the secure signature 107 present in the clear data packet 101 as shown in steps 12 and 13. The appropriate status bits and, in particular, the alternate done bit 138 are set once decryption and authentication are both complete. The status bits are provided to the descriptor update circuit 60, which, in turn, writes the status bits to the EMAC descriptor 26 as shown in step 14. In this manner, the inline logic circuit 50 is again able to coordinate the functions it performs with the SPP module 32 attempting to access the data from shared memory 20.

As previously indicated, certain data packets may require no security operation, other data packets may require authentication only, and still other data packets may require both authentication and decryption. Because the SPP module 32 monitors the alternate done bit 138, the inline logic circuit 50 sets this bit appropriately for data packets requiring any level of security. The inline logic circuit 50 may build the CDE descriptor 28 as discussed above and, upon detecting the CDE done bit 162 being set, perform authentication and proceed to set the alternate done bit 138. If authentication only is required, the inline logic circuit 50 may set the alternate done bit 138 according to the method illustrated in and discussed with respect to FIG. 6. If no security operation is required, the inline logic circuit 50 may set the alternate done bit 138 as soon as the EMAC 18 sets the EMAC done bit 136. The SPP module 32 monitors the EMAC descriptor 26 for the alternate done bit being set before attempting to access the data from shared memory. Thus, the SPP module 32 will always have access to clear data in the shared memory 20 and will be able to access status bits in the EMAC descriptor 26 to know whether authentication, if required, was successful and if the data in the shared memory is ready for use by applications, such as a control program, executing on the processor 30 of the network device 10.

Although execution of decryption and authentication by the inline logic circuit 50 has been described above with respect to FIG. 10 and with respect to certain modules, or circuits, illustrated therein, including the parser 52, the security lookup circuit 54, the security function circuit 56, the signature compare circuit 58, and the descriptor update circuit 60, it is understood that each circuit is a portion of the inline logic circuit 50 and the particular delineation of modules to perform different functions is not intended to be limiting. Rather, the above embodiment illustrated in FIG. 10 is intended to be exemplary and provides one embodiment of the invention. It is contemplated that the functions performed by specific modules may be performed by other modules or multiple modules may be combined into a single module without deviating from the scope of the invention. Each of the modules described herein is implemented on a portion of the customizable logic device and/or discrete logic devices which make up the inline logic circuit 50.

Figure 7:
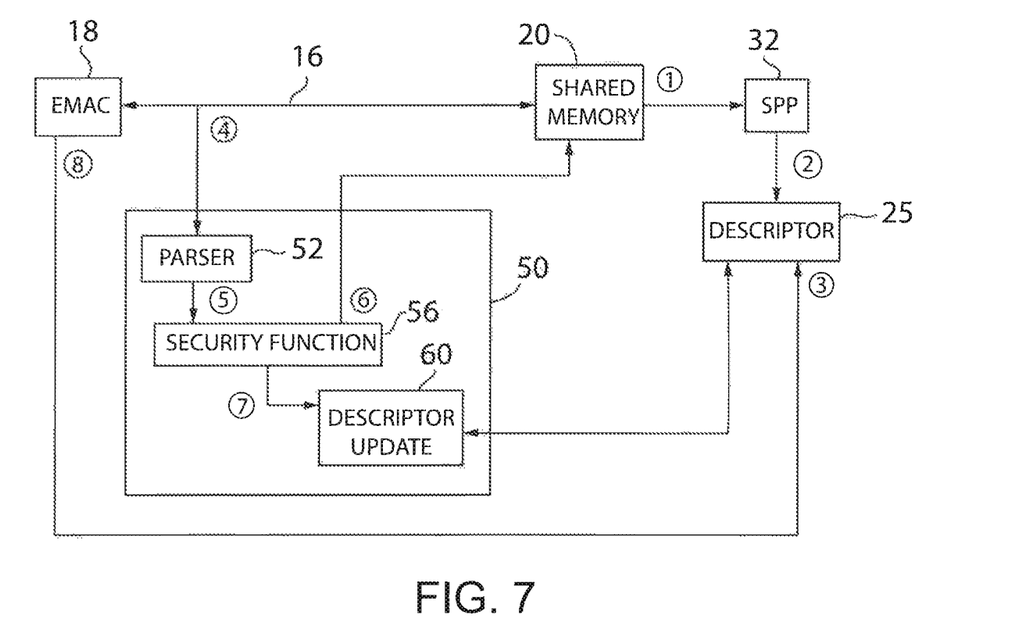
FIG. 7 is a flow diagram illustrating steps in high speed authentication of data packets to be transmitted according to one embodiment of the invention.

Turning next to FIG. 7, the process of generating a secure signature 107 for a data packet 101 to be transmitted by the network device 10 will be discussed, where the secure signature is used for authentication by the device receiving the data packet as previously discussed. Unlike performing authentication at the receiving device, where the inline engine 50 must monitor and obtain all of the information to perform authentication from the incoming data packet, the transmitting device has knowledge of the authentication routine to be performed. The inline engine 50 may, therefore, work in tandem with the SPP module 32 to generate the secure signature 107 for a data packet 101 to be transmitted. Because the SPP module 32 is responsible for establishing connections with another device, determining what security operation is required for the connection, and assembling the data for transmission, the SPP module 32 may directly communicate with the inline engine 50 to provide the required security operation for a particular data packet, which can bypass the lookup steps required for incoming data packets. At step 1 (again indicated by a circled numeral), data to be transmitted is assembled into a data packet 101 by the SPP module and written to shared memory 20. The SPP module 32 may monitor the transmit queues 22 and identify the next available location for data to be written within the transmit queue. At step 2, a transmit descriptor 27 is generated and written to the descriptor table 25. It is contemplated that steps 1 and 2 may be executed in tandem or in reverse order according to configuration of the SPP module. As previously discussed, the descriptor table 25 may be read from and written to by the EMACs 18 in the network interface 12, the inline engine 50, and the SPP module 32. The descriptor table may be a circular buffer, where data is initially written into the first entry of the table and each successive entry is consecutively stored in the table. When the number of entries written into the table is equal to the size of the table, the next entry overwrites the oldest entry in the table. Each new entry will continually over-write the oldest entry forming the circular buffer.

It is contemplated that the descriptor utilized for transmitting a data packet 101 may be identical to the descriptor generated upon reception of a data packet. Optionally, the SPP module 32 may generate a different descriptor 27 for transmission of a data packet 101 than the descriptor 26 generated by the network interface 12 upon receipt of a data packet 101. In any event, the descriptors 26-29 illustrated herein are intended to be exemplary and may illustrate only a portion of the content included within the respective descriptors. According to the descriptor 27 illustrated in FIG. 8, the SPP module 32 generates three segments 180, 185, 190 for the descriptor. The first segment 180 defines an address 182 and a length 184 of the header for the data packet 101. The second segment 185 defines an address 186 and a length 188 for the payload of the data packet 101. The third segment 190 defines an address 192 and a length 194 for the secure signature. In some embodiments, the length 194 of the secure signature may be omitted. The length of the secure signature may be constant and may, therefore, may not be needed. In some embodiments, a standard module or function reads each of the three segments 180, 185, 190 in order and expects both an address and length to be present in the segment and, therefore, the length may be needed.

At step 3 shown in FIG. 7, the EMAC 18 in the network interface 12 detects the presence of the data packet 101 for transmission by monitoring an availability status word 196 in the transmit descriptor 27. The availability status word 196 may include multiple individual status bits 197, 199 used by the inline logic circuit 50 to synchronize operation of different modules. A first status bit 197 indicates to the EMAC 18 that it now has ownership of the data packet 101 and may begin moving the data packet from the shared memory 20 to an output buffer 14 in the network interface 12. The data packet 101 is internally transferred between the shared memory 20 and the output buffer 14 via the communication bus 16.

Because the SPP module 32 and the inline logic circuit 50 are both on the transmitting device, it is contemplated that various methods of notifying the inline logic circuit 50 that the data packet 101 is ready for transmission may be utilized. The SPP module 32 may set an interrupt, set an internal status bit, transfer a direct signal, or the like. Optionally, the logic circuit 50 may also monitor the status bit 197 indicating that the data is present in a transmit queue 22 of the shared memory 20 and is ready for the network interface 12. According to still another aspect of the invention, the inline logic circuit 50 may detect the data packet as the EMAC 18 begins transferring the packet from the shared memory 20 to the output buffer 14.

The inline logic circuit 50 uses the data received from the communication bus 16 to generate the secure signature 107 for the data packet 101 as the data packet 101 is being transferred between the shared memory 20 and the output buffer 14. As the data packet 101 is being transferred over the communication bus 16, the inline logic circuit 50 monitors the data being transferred, as shown in step 4. The inline logic circuit 50 receives the data as a read only function from the communication bus 16 and does not interfere with transmission of the data from the shared memory 20 to the output buffer in the network interface 12. The inline logic circuit 50 is also in communication with the descriptor table 25 and may similarly monitor the descriptor table 25 for a data packet 101 ready for transmission. The inline logic circuit 50 may be configured to read the header address 182 and length 184 from the descriptor 27 to obtain the header information for the data packet. In turn, the inline logic circuit 50 may then read the secure header 105 for the data packet 101 to identify the desired security operation to perform to obtain the secure signature 107. Optionally, the data received from the communication bus 16 is received by the parser 52 and may be used to obtain the desired security operation in a manner similar to that described above with respect to determining the security operation for an incoming data packet. However, because the inline logic circuit 50 is on the transmitting device, it may utilize known data for each data packet 101, where the SPP module, for example, may generate the known data, rather than parsing the header to obtain a desired security operation.

Having obtained or determined a desired security operation, the parser 52 passes the data from the communication bus 16 to the security function circuit 56 in order to generate the secure signature 107 for the data packet. The security operation is executed on the secure header 105 and the payload 106 of the data packet 101 in order to generate the secure signature 107. For a key-based operation, the inline logic circuit 50 may have prior knowledge of a key or an address for a key because the inline logic circuit 50 is located on the transmitting device and the SSP module 32 may provide the information directly to the logic circuit 50. Optionally, the parser 52 may obtain a key from the Security Association table in a manner similar to that discussed above for a received packet. The inline logic circuit 50 uses the secure key and the key-based operation to generate the authentication signature for the data packet 101. It is contemplated that generation of the secure signature 107 is performed, for example via a keyed-hash algorithm, also referred to as a Hash-based Message Authentication Code (HMAC). Optionally, other security operations may be utilized without deviating from the scope of the invention. Data is continually received at the parser 52 from the communication bus 16, and the parser 52 forwards the additional data from the data packet 101 to the security function circuit 56. The length 116 of data may be read from the secure header 105 by the inline logic circuit 50 after obtaining the header address from the descriptor 27 or, optionally, the parser 52 may extract the length as the data is received from the communication bus 16. Knowing the length of data to be transmitted, the security function circuit 56 is able to generate a secure signature 107 for the data packet 101.

Figure 8:
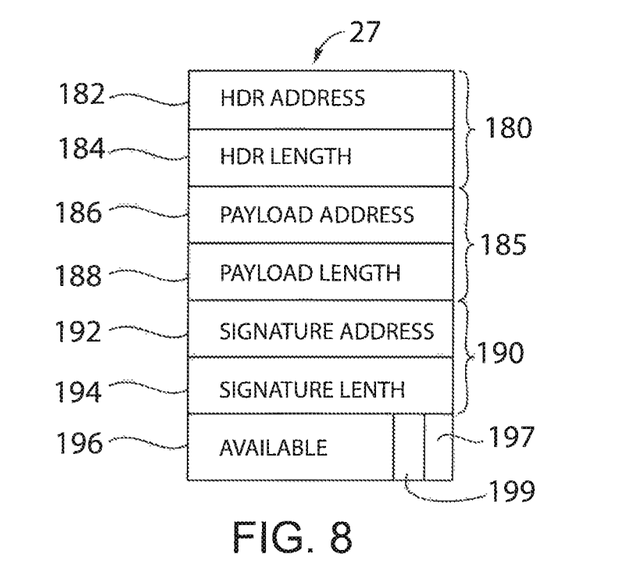
FIG. 8 is a block diagram illustrating, at least in part, an exemplary structure of a descriptor generated by a SPP module for transmission of a data packet.
Figure 9:
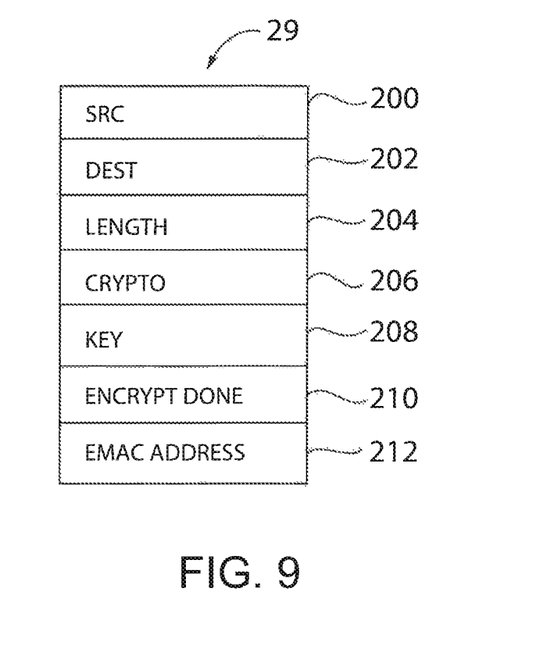
FIG. 9 is a block diagram illustrating, at least in part, an exemplary structure of an encryption descriptor utilized by the CDE of FIG. 1 to encrypt data packets to be transmitted.

After the inline logic circuit 50 generates the secure signature 107, the secure signature is appended to the data packet 101. As shown in FIG. 8, the address 192 and length 194 of the secure signature are included in the transmit descriptor 27. The inline logic circuit 50 may read the address and length from the descriptor table 25 and write the secure signature 107 to the proper address as shown in step 6. Optionally, the descriptor 27 may include just an address, if the length is fixed, and the inline logic circuit 50 uses just the signature address 192 to append the secure signature 107 to the data packet 101. The address and length in the descriptor 27 serve as a third segment of the data packet to be transferred to the output buffer 14. The address may be mapped to an internal register or to shared memory 20 and may be subsequently read by the EMAC 18 to transfer the secure signature 107 to the output buffer.

The inline logic circuit 50 manages access to the signature address to prevent the network interface 12 from accessing that memory location before the secure signature 107 has been written by the inline logic circuit. It is contemplated that the network device 10 includes some method of DMA and an associated DMA controller. As the EMAC 18 transmits the data packet 101 between the shared memory 20 and the output buffer, the inline logic circuit 50 is monitoring the data transfer on the communication bus 16. If the EMAC reaches the address of the secure signature 107 and the inline logic circuit 50 has not finished generating the secure signature and writing it to the address, the inline logic circuit 50 may pause the slave read response transfer being executed by the EMAC 18. Once the inline logic circuit 50 has written the secure signature 107 to the address, it may allow the EMAC 18 to resume its transfer. The interaction between the inline logic circuit 50 and the EMAC 18 may occur using a Universal Asynchronous Receive and Transmit (UART) interface with read and busy signals to allow the transfer only after the data is ready. Because the inline logic circuit 50 is reading the data from the communication bus 16 and then executing the security operation to generate the secure signature 107, it will complete generation of the secure signature a few read cycles after the data has been transferred. The EMAC 18 pauses since the communication bus must wait for the slave response. Consequently, only after the secure signature 107 has been calculated and written to the signature address 192 or made available as a target on the communication bus will the EMAC 18 be able to transfer the secure signature 107 to the output buffer 14. At that time, the inline logic circuit 50 releases access to the memory location and the EMAC 18 is able to read the newly determined secure signature 107 and transfer it to the output buffer. Optionally, the descriptor 27 may define a status flag that is monitored by the EMAC 18 to indicate the availability of the secure signature 107. With reference to FIG. 8, an available status flag 199, which may be a dedicated bit, part of the availability word 196, or the like is defined. The EMAC 18 may be configured to monitor the available status flag 199 before attempting to transfer the secure signature 107 to the output buffer. When the inline logic circuit 50 has completed writing the secure signature 107 to the address 192 indicated in the descriptor, the security function circuit 56 may direct the descriptor update circuit 60 to set the available status flag 199 and allow the EMAC 18 to proceed as shown in step 7 of FIG. 7. At step 8 of FIG. 7, the EMAC 18 is polling the descriptor table 25 to detect setting of the available status flag 199 and transfers the secure signature 107 to the output buffer after it is available. Once the entire data packet 101 has been transferred to the output buffer, the EMAC may append the Ethernet header 102 and CRC 108 to complete the data frame 100 and queue the data frame 100 for transmission on the network.

Although transmitting and generating secure signatures for data packets with the inline logic circuit 50 has been described above with respect to FIG. 7 and with respect to certain modules, or circuits, illustrated therein, including the parser 52, the security function circuit 56, and the descriptor update circuit 60, it is understood that each circuit is a portion of the inline logic circuit 50 and the particular delineation of modules to perform different functions is not intended to be limiting. Rather, the above embodiment illustrated in FIG. 7 is intended to be exemplary and provides one embodiment of the invention. It is contemplated that the functions performed by specific modules may be performed by other modules or multiple modules may be combined into a single module without deviating from the scope of the invention. Each of the modules described herein is implemented on a portion of the customizable logic device and/or discrete logic devices which make up the inline logic circuit 50.

Figure 11:
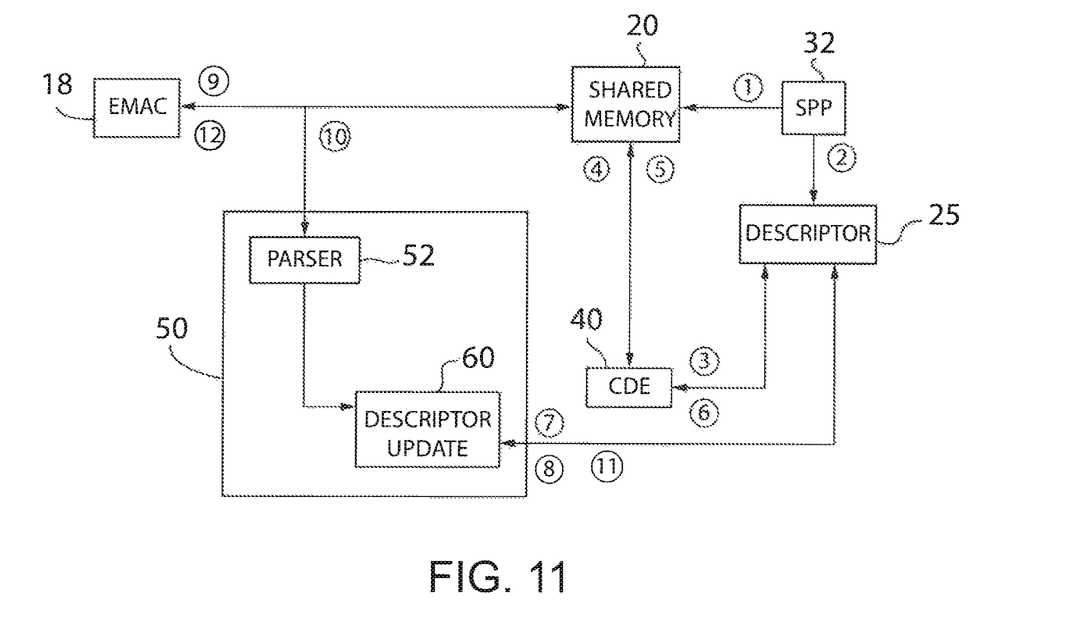
FIG. 11 is a flow diagram illustrating steps for encryption of data packets to be transmitted from the network device according to one embodiment of the invention.

In some applications, data packets 101 may require encryption in addition to a secure signature for authentication prior to transmission. Turning next to FIG. 11, the process of encrypting data prior transmission is illustrated. At step 1 (again indicated by a circled numeral), data to be transmitted is assembled into a data packet 101 by the SPP module and written to shared memory 20. At step 2, a pair of descriptors 27, 29 are generated and written to the descriptor table 25. The first descriptor 27 may be a suitable descriptor for the EMAC 18 and the second descriptor 29 may be a suitable descriptor for the CDE 40. Each descriptor 27, 29 is written into a separate descriptor ring. It is contemplated that steps 1 and 2 may be executed in tandem or in reverse order according to configuration of the SPP module. As previously discussed, the descriptor table 25 may be read from and written to by the EMACs 18 in the network interface 12, the inline engine 50, and the SPP module 32. The descriptor table may be a circular buffer, where data is initially written into the first entry of the table and each successive entry is consecutively stored in the table. When the number of entries written into the table is equal to the size of the table, the next entry overwrites the oldest entry in the table. Each new entry will continually over-write the oldest entry forming the circular buffer.

If encryption is required, the CDE 40 periodically monitors the encryption descriptor ring for an encryption descriptor 29 to be written to the descriptor table 25 as shown in step 3. Each encryption descriptor 29 includes multiple fields defining, among other things, a source 200, destination 202, and length 204 of the message packet 101. The source 200 defines a memory address from which the CDE can read the clear data to be encrypted. The destination 202 defines a memory address at which the CDE can write the encrypted data, and the length 204 defines a length of data requiring encryption. The encryption descriptor 29 may also include a cryptography method 206 employed to encrypt the data packet and a key 208 required to perform decryption. An encryption done bit 210 is also defined within the encryption descriptor 29. Finally, the encryption descriptor 29 may also include a link used to synchronize encryption with a corresponding EMAC descriptor as illustrated by the EMAC address 212 field. Inclusion of the EMAC address 212 field, allows the SSP module 32 to simply hand off the data to the EMAC 18 and/or the inline engine 50 and the inline engine 50 coordinates multiple operations that are required to be performed on the data prior to transmitting the data.

Upon detection of a new encryption descriptor 29, the CDE 40 manages encryption according to the encryption descriptor 29. The CDE 40 reads the packet to be decrypted from the source address 200 as shown in step 4. It is contemplated that the source address is the same location in the shared memory 20 to which the SPP module 32 has written the data to be transmitted. Once the SPP module 32 has written the data to the shared memory 20 and generated the descriptor 29, the CDE 40 may begin reading the same data. The CDE 40 performs the encryption on the data packet 101 according to the cryptographic method specified in field 206 and using the key identified in field 208 of the encryption descriptor 29. The CDE 40 then writes the encrypted data back to the destination address 202 indicated in the CDE descriptor 28 as shown in step 5. It is contemplated that the destination address 202 may be the same as the source address 200. In this manner, the CDE 40, can cause encrypted data to be present in the shared memory 20 rather than the clear data originally written by the SPP module 32. Once the CDE 40 has written the encrypted data back to the destination address 202, the CDE 40 sets the encryption done bit 210 in the encryption descriptor 29 as shown in step 6.

Once the encryption is complete, the inline logic circuit 50 is operative to coordinate further operations that may be required to move the encrypted data from the shared memory 20 to the output buffer for transmission. As shown at step 7, the inline logic circuit detects the encryption done status bit 210 being set and identifies the memory location of the corresponding EMAC descriptor 27 according to the address 212 stored in the descriptor. The inline logic circuit 50 may periodically or continually monitor the descriptor table 25 to detect a chance in the status of the descriptors 27, 29 in the descriptor rings. Optionally, the inline logic circuit 50 passively monitors the CDE 40 and/or the EMAC 18 accessing the shared memory 20 and/or the descriptor table 25 to detect completion of encryption. When encryption is required, the SPP module may generate the EMAC descriptor 27 but initially provide no signal to the EMAC 18 (e.g., keep the status bit 197 clear) that the data in the shared memory 20 is ready, such that the EMAC 18 does not begin transferring the data from shared memory 20 to the output buffer. At step 8, the inline logic circuit 50 may now set the status bit 197 for the corresponding EMAC descriptor 27 indicating to the EMAC 18 that data is ready in the shared memory 20 in order to trigger the EMAC 18 to begin transferring encrypted data from shared memory 20 to the output buffer as shown in step 9. It should be appreciated that the SPP module 32 is done handling the data after it passes the first descriptor 29 to the CDE 40. Such execution for data packets 101 requiring encryption is the same for the SPP module 32 as if the data packet 101 only requires authentication or if the data packet required no security operation. The only additional execution required by the SPP module 32 is the generation of two descriptors 27, 29 rather than a single descriptor 29. The inline logic circuit 50 will then coordinate execution of the CDE 40 and the EMAC 18 to encrypt and transmit the data.

The inline logic circuit 50 may further coordinate with the EMAC 18 to indicate when the secure signature 107 is available for reading if authentication of the data packet 101 is required. According to one embodiment of the invention, it is contemplated that the inline logic circuit 50 may operate in the manner described above for data packets in which no encryption is required. At step 10, the inline logic circuit 50 receives the now encrypted data packets as they are passed between the shared memory 20 and the output buffer 14 in the same manner as it received clear packets, discussed above. The various modules of the inline logic circuit 50 may work to generate the secure signature, append the secure signature to the data packet, and set the signature available 196 status flag as previously discussed. In this embodiment, the CDE 40 performs encryption and the logic circuit 50 performs authentication. In another embodiment of the invention, it is contemplated that the CDE 40 may be configured to both perform encryption and to generate a secure signature while it is performing the encryption. Thus, when the CDE 40 writes the encrypted data back to the destination 202, it is also writing a secure signature 107 to the data packet 101. In this embodiment, the inline logic circuit does not need to generate a secure signature and, therefore, may immediately set the signature available status flag 196 as shown in step 11. In either embodiment, the EMAC 18 is configured to poll the descriptor table 25 to detect setting of the available status flag 199 as shown at step 12. As discussed above, if the inline logic circuit 50 is configured to generate the secure signature 107 a short delay may be required between transferring the payload 106 and the secure signature 107 to the output buffer. If, however, the CDE 40 generates the secure signature 107 while it is performing encryption, no delay is necessary and the EMAC 18 may continually read from the payload 106 to the secure signature 107 when transferring data to the output buffer. Once the entire data packet 101 has been transferred to the output buffer, the EMAC may append the Ethernet header 102 and CRC 108 to complete the data frame 100 and queue the data frame 100 for transmission on the network. In this manner, the SPP module 32 need only handle the data packet 101 once, generating the appropriate descriptors 27 and/or 29 and the inline logic circuit 50 coordinates generation of a secure signature 107 and/or encryption as required for the data packet 101.

Although encryption as well as transmitting and generating secure signatures for data packets with the inline logic circuit 50 has been described above with respect to FIG. 11 and with respect to certain modules, or circuits, illustrated therein, including the parser 52 and the descriptor update circuit 60, it is understood that each circuit is a portion of the inline logic circuit 50 and the particular delineation of modules to perform different functions is not intended to be limiting. Rather, the above embodiment illustrated in FIG. 1 is intended to be exemplary and provides one embodiment of the invention. It is contemplated that the functions performed by specific modules may be performed by other modules or multiple modules may be combined into a single module without deviating from the scope of the invention. Each of the modules described herein is implemented on a portion of the customizable logic device and/or discrete logic devices which make up the inline logic circuit 50.

It should be understood that the invention is not limited in its application to the details of construction and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

I claim:

1. A method for managing transmission of secure data packets, comprising the steps of:
    writing a data packet for transmission to a shared memory location defined on a shared memory within a network device;
    transferring the data packet from the shared memory location to an output buffer for a network interface in the network device, wherein:
        the network interface includes at least one port configured to be connected to a network external from the network device,
        the output buffer for the network interface is associated with the at least one port,
        the data packet is transferred via a communication bus connected between the shared memory and the output buffer within the network device, wherein a Media Access Controller (MAC) executing on the network device initiates the transfer of the data packet from the shared memory location to the output buffer;
    reading the data packet from the communication bus with an inline logic circuit located within the network device, wherein:
        the inline logic circuit is operatively connected to the communication bus between the shared memory and the output buffer, and
        the inline logic circuit performs a read only function from the communication bus between the shared memory location and the output buffer to read the data packet as the data packet is transferred from the shared memory location to the output buffer without interfering with the transmission of the data packet;
    generating a secure signature of the data packet with the inline logic circuit as the data packet is transferred by the MAC from the shared memory location to the output buffer;
    appending the secure signature to the data packet with the inline logic circuit; and
    queuing the data packet for transmission from the output buffer of the network interface with the MAC after the secure signature has been appended to the data packet.

2. The method of claim 1 further comprising the step of generating a descriptor corresponding to the data packet, wherein:
    the descriptor includes a first address and a first length corresponding to a header of the data packet,
    the descriptor includes a second address corresponding to the secure signature for the data packet,
    the descriptor is written to a descriptor ring in memory, and
    the MAC monitors the descriptor ring to detect availability of the data packet for transmission.

3. The method of claim 2 wherein the descriptor includes either a status bit or a pointer to a status bit, wherein the status bit indicates to the MAC that the data packet is available to be transferred from the shared memory location to the output buffer.

4. The method of claim 2 wherein the step of appending the secure signature to the data packet includes writing the secure signature to the second address with the inline logic circuit.

5. The method of claim 4 further comprising the steps of:
    setting ownership of the second address to the inline logic circuit while transferring the data packet from the shared memory location to the output buffer; and
    releasing ownership of the second address when the secure signature has been appended to the data packet.

6. The method of claim 2 wherein the step of appending the secure signature to the data packet further comprises the following steps, wherein each of the following steps is performed by the inline logic circuit:
    determining a security operation for the data packet;
    determining the secure signature for the data packet as it is read from the communication bus via the security operation; and
    writing the secure signature to the second address.

7. The method of claim 6 wherein the step of determining the security operation for the data packet further comprises the steps of:
    monitoring the descriptor ring with the inline logic circuit to detect the availability of the data packet for transmission; and
    determining the security operation from the corresponding descriptor for the data packet.

8. The method of claim 6 wherein the step of determining the security operation for the data packet further comprises the steps of:
    identifying the header of the data packet as it is received by the inline logic circuit from the communication bus; and
    parsing the header of the data packet to determine the security option.

9. The method of claim 6 wherein the step of determining the secure signature for the data packet further comprises the steps of:
- identifying a secure hash algorithm as a function of the security operation;
- streaming the data packet through the secure hash algorithm as it is read from the communication packet; and
- setting the secure signature to the output of the secure hash algorithm when the entire data packet has finished being streamed through the secure hash algorithm.

10. A communication circuit for managing transmission of secure data packets within a network device, the communication circuit comprising:
- a shared memory;
- a software packet processing module configured to write a data packet for transmission to a shared memory location defined in the shared memory;
- a network interface, including:
  - at least one port configured to be connected to a network external from the network device,
  - an output buffer associated with the at least one port, and
  - a Media Access Controller (MAC) configured to transfer the data packet from the shared memory to the output buffer via a communication bus connected between the shared memory and the output buffer and to queue the data packet for transmission from the output buffer; and
- an inline logic circuit operatively connected to the communication bus between the shared memory and the output buffer, wherein the inline logic circuit is configured to:
  - execute a read only function to read the data packet from the communication bus as the data packet is transferred from the shared memory location to the output buffer by the MAC, wherein the read only function does not interfere with the transmission of the data packet,
  - generate a secure signature of the data packet as the data packet is being transferred by the MAC from the shared memory location to the output buffer, and
  - append the secure signature to the data packet, wherein the data packet is queued for transmission from the output buffer by the MAC after the secure signature has been appended to the data packet.

11. The communication circuit of claim 10, wherein the software packet processing module is further configured to generate a descriptor corresponding to the data packet, wherein:
- the descriptor includes a first address and a first length corresponding to a header of the data packet,
- the descriptor includes a second address corresponding to the secure signature for the data packet,
- the descriptor is written to a descriptor ring in memory, and
- the MAC monitors the descriptor ring to detect availability of the data packet for transmission.

12. The communication circuit of claim 11 wherein the inline logic circuit is further configured to append the secure signature to the data packet by writing the secure signature to the second address.

13. The communication circuit of claim 12 wherein the inline logic circuit is further configured to:
- set ownership of the second address to the inline logic circuit while transferring the data packet from the shared memory location to the output buffer; and
- release ownership of the second address when the secure signature has been appended to the data packer.

14. The communication circuit of claim 11 wherein the inline logic circuit is further configured to generate the secure signature by determining a security operation for the data packet and determining the secure signature for the data packet as it is read from the communication bus via the security operation.

15. The communication circuit of claim 14 wherein the inline logic circuit is further configured to determine the security operation for the data packet by:
- monitoring the descriptor ring to detect the availability of the data packet for transmission; and
- determining the security operation from the corresponding descriptor for the data packet.

16. The communication circuit of claim 14 wherein the inline logic circuit is further configured to determine the security operation for the data packet by:
- identifying the header of the data packet as it is received from the communication bus; and
- parsing the header of the data packet to determine the security option.

17. The communication circuit of claim 14 wherein the inline logic circuit is further configured to generate the secure signature of the data packet by:
- identifying a secure hash algorithm as a function of the security operation;
- streaming the data packet through the secure hash algorithm as it is read from the communication packet; and
- setting the secure signature to the output of the secure hash algorithm when the entire data packet has finished being streamed through the secure hash algorithm.

18. A method for managing transmission of secure data packets within a network device comprising the steps of:
- writing a data packet for transmission to a shared memory with a software packet processing module, wherein a header for the data packet defines a secure operation to perform on the data packet prior to transmission;
- writing a descriptor to a descriptor ring in the shared memory with the software packet processing module;
- periodically monitoring the descriptor ring with a Media Access Controller (MAC) executing in the network device to detect when the data packet is available for transmission;
- transferring the data packet from the shared memory to an output buffer in the network interface via a communication bus, wherein the data packet is transferred by the MAC when the data packet is available;
- reading the data packet from the communication bus with an inline logic circuit operatively connected to the communication bus between the shared memory and the output buffer, wherein the inline logic circuit reads the data packet from the communication bus as the data packet is transferred from the shared memory to the output buffer by the MAC without interfering with the transmission of the data packet;
- setting a done bit with the inline logic circuit when the data packet has been transferred to the output buffer and the data packet is ready for transmission; and
- queueing the data packet for transmission from the network interface with the MAC after the inline logic circuit has set the done bit.

19. The method of claim 18 wherein:
- the secure operation is generation of a secure signature;
- the inline logic circuit is configured to generate the secure signature as the data packet is transferred from the shared memory to the output buffer;

the inline logic circuit is configured to write the secure signature to an address defined in the descriptor for the corresponding data packet; and the inline logic circuit is configured to set the done bit when the secure signature has been written to the address.

20. The method of claim 18 wherein:

the software packet processing module is further configured to generate an encryption descriptor;

an encryption module is configured to encrypt the data packet and to generate the secure signature;

the encryption module is configured to write the encrypted data packet to the shared memory and to generate an encryption done bit;

the MAC is configured to transfer the encrypted data packet from the shared memory to the output buffer and the encrypted data packet is read from to communication bus by the inline circuit as it is transferred from the shared memory to the output buffer; and the inline logic circuit is configured to set the done bit when the encrypted data packet has been transferred from the shared memory to the output buffer.

* * * * *